(12) United States Patent
Shemtov

(10) Patent No.: US 10,851,926 B2
(45) Date of Patent: Dec. 1, 2020

(54) NON-METALLIC LIQUID-TIGHT CONDUIT CONNECTOR

(71) Applicant: Atkore Steel Components, Inc., Coconut Creek, FL (US)

(72) Inventor: Sami Shemtov, Hollywood, FL (US)

(73) Assignee: Atkore Steel Components, Inc., Coconut Creek, FL (US)

(*) Notice: Subject to any disclaimer, the term of this patent is extended or adjusted under 35 U.S.C. 154(b) by 421 days.

(21) Appl. No.: 15/914,278

(22) Filed: Mar. 7, 2018

(65) Prior Publication Data

US 2019/0277431 A1 Sep. 12, 2019

(51) Int. Cl.
| | |
|---|---|
| *F16L 33/24* | (2006.01) |
| *F16L 33/00* | (2006.01) |
| *H02G 3/06* | (2006.01) |
| *F16L 19/065* | (2006.01) |

(52) U.S. Cl.
CPC .............. *F16L 33/24* (2013.01); *F16L 19/065* (2013.01); *F16L 33/006* (2013.01); *H02G 3/0616* (2013.01); *Y10T 29/49826* (2015.01)

(58) Field of Classification Search
CPC . F16L 33/24; F16L 33/006; F16L 5/06; F16L 19/065; H02G 3/0616

USPC .......................................... 285/149.1, 151.1
See application file for complete search history.

(56) References Cited

U.S. PATENT DOCUMENTS

| | | | | |
|---|---|---|---|---|
| 5,068,494 | A * | 11/1991 | Bolante | 285/149.1 |
| 6,642,451 | B1 * | 11/2003 | Gretz | |
| 7,431,343 | B2 * | 10/2008 | Chiu | 285/151.1 |
| 8,910,980 | B2 | 12/2014 | Neal et al. | |
| 9,343,883 | B2 | 5/2016 | Decesare et al. | |
| 9,787,070 | B2 | 10/2017 | Decesare et al. | |
| 2004/0255608 | A1 * | 12/2004 | Hector | F16L 19/065 |
| 2005/0035593 | A1 * | 2/2005 | Auray | F16L 19/065 |

* cited by examiner

*Primary Examiner* — Zachary T Dragicevich

(57) ABSTRACT

A connector for a flexible non-metallic conduit is provided. The connector may include a gland nut for receiving the conduit, and a gland ring within the gland nut. The gland ring may be sized to extend around the conduit. The connector may further include a body threadably secured to the gland nut, and a ferrule disposed within the body, wherein the ferrule includes a first keying feature coupled to a second keying feature of the body to cause rotation therebetween, and wherein the ferrule is inserted partially into the conduit. In some embodiments, the gland nut is not directly physically coupled to the conduit, so the gland nut may slide over the conduit towards/away from the body. In some embodiments, during assembly, the body and the gland nut may be rotated together to cause external threading of the ferrule to engage an inner wall of the conduit.

20 Claims, 5 Drawing Sheets

NON-METALLIC LIQUID-TIGHT CONDUIT CONNECTOR

FIELD OF THE DISCLOSURE

The disclosure relates generally to conduit connectors and, more particularly, to a connector suitable for use with flexible non-metallic liquid-tight conduit.

BACKGROUND OF THE DISCLOSURE

Conduits, such as flexible conduits, are used in a wide range of applications. Connectors or fittings, such as liquid-tight fittings, are designed to protect conduits from various types of environments, such as wet or corrosive environments. For example, liquid-tight fittings may be used in wastewater treatment applications, saltwater applications, petrochemical refining applications, and food processing applications.

Conventional fittings are generally tubular, with threaded opposite ends for receiving the conduit and/or opening of a structure, such as a junction box. These fittings may include a locknut, a sealing ring, a connector body, a ferrule, a compression ring and a compression nut. Most conventional fittings disadvantageously require a multi-step installation process that requires the initial disassembly of the packed fitting device before re-assembly and installation. For example, installation of a conventional fitting over a conduit may involve at least six steps. Firstly, before the installation process begins, the fitting out of the package must be initially disassembled, as it is packaged fully assembled to avoid loose parts that can be easily lost or misplaced. Next, the compression nut is slid over the conduit. The compression ring is then slid over the conduit, and the threaded ferrule is slid into the conduit. Next, the connector body is slid over a flared end of the ferrule. Subsequently, the compression nut and ring are slid towards the connector body. Lastly, the compression nut is tightened against the connector body.

Therefore, there is a need for a coupling device that effectively provides a liquid tight seal around a conduit and facilitates quick coupling of conduits without the need for initial disassembly of the coupling device connector before re-assembly and installation.

SUMMARY

An exemplary non-metallic liquid-tight (NMLT) assembly may include a gland nut for receiving a non-metallic flexible conduit, and a gland ring within the gland nut, the gland ring sized to extend around the non-metallic flexible conduit. The NMLT assembly may further include a body threadably secured to the gland nut, and a ferrule disposed within the body, wherein the ferrule includes a first keying feature coupled to a second keying feature of the body to enable simultaneous rotation of the ferrule and the body, and wherein the ferrule is inserted partially into the non-metallic flexible conduit.

An exemplary connector for a flexible non-metallic conduit may include a gland nut for receiving the flexible non-metallic conduit, and a gland ring within the gland nut, the gland ring sized to extend around the flexible non-metallic conduit. The connector may further include a body threadably secured to the gland nut, and a ferrule disposed within the body, wherein the ferrule includes a first keying feature coupled to a second keying feature of the body to enable simultaneous rotation of the ferrule and the body, and wherein the ferrule is inserted partially into the flexible non-metallic conduit.

An exemplary method of forming non-metallic liquid-tight (NMLT) assembly may include extending a gland nut and a gland ring over an exterior of a flexible conduit, and coupling a ferrule with the flexible conduit, wherein an external threading of the ferrule extends within the flexible conduit, and wherein a flange of the ferrule is in abutment with an end of the flexible conduit. The method may further include coupling a body to the ferrule, wherein the ferrule includes a first keying feature engaged with a second keying feature of the body to allow rotation of the body together with the ferrule. The method may further include rotating the gland nut about the body to secure the gland nut with the body.

BRIEF DESCRIPTION OF THE DRAWINGS

The accompanying drawings illustrate exemplary approaches of the disclosed embodiments so far devised for the practical application of the principles thereof.

Figure 1:
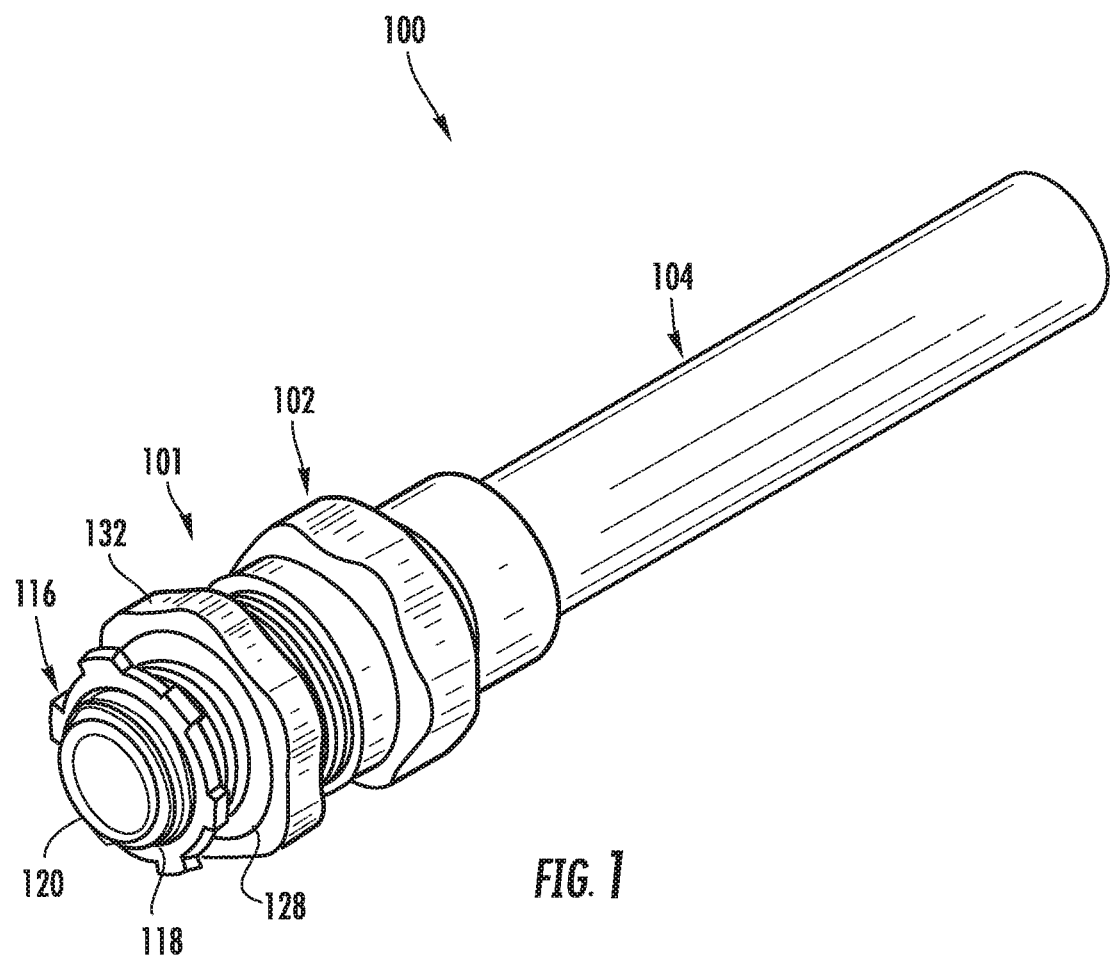
FIG. 1 is a first perspective view of an assembly in accordance with embodiments of the present disclosure.

The drawings are not necessarily to scale. The drawings are merely representations, not intended to portray specific parameters of the disclosure. The drawings are intended to depict exemplary embodiments of the disclosure, and therefore are not be considered as limiting in scope. In the drawings, like numbering represents like elements.

Furthermore, certain elements in some of the figures may be omitted, or illustrated not-to-scale, for illustrative clarity. The cross-sectional views may be in the form of "slices", or "near-sighted" cross-sectional views, omitting certain background lines otherwise visible in a "true" cross-sectional view, for illustrative clarity. Furthermore, for clarity, some reference numbers may be omitted in certain drawings.

DETAILED DESCRIPTION

Multi-purpose assemblies/fittings/couplings/connectors suitable for use with flexible non-metallic liquid-tight conduit (e.g., "type-A") in accordance with the present disclosure will now be described more fully hereinafter with reference to the accompanying drawings, where embodiments of the conduit assemblies/fittings/couplings/connectors are shown. The assemblies/fittings/couplings/connectors may be embodied in many different forms and are not be construed as being limited to the embodiments set forth herein. Instead, these embodiments are provided so this disclosure will be thorough and complete, and will fully convey the scope of the system and method to those skilled in the art.

For the sake of convenience and clarity, terms such as "top," "bottom," "upper," "lower," "vertical," "horizontal," "lateral," and "longitudinal" will be used herein to describe the relative placement and orientation of these components and their constituent parts. The terminology will include the words specifically mentioned, derivatives thereof, and words of similar import.

As used herein, an element or operation recited in the singular and proceeded with the word "a" or "an" are understood as potentially including plural elements or operations as well. Furthermore, references to "one embodiment" of the present disclosure are not intended to be interpreted as precluding the existence of additional embodiments also incorporating the recited features.

A connector for a flexible non-metallic conduit is provided. The connector may include a gland nut for receiving the conduit, and a gland ring within the gland nut. The gland ring may be sized to extend around the conduit. The connector may further include a body threadably secured to the gland nut, and a ferrule disposed within the body, wherein the ferrule includes a first keying feature coupled to a second keying feature of the body to cause rotation therebetween, and wherein the ferrule is inserted partially into the conduit. In some embodiments, the gland nut is not directly physically coupled to the conduit, so the gland nut may slide over the conduit towards/away from the body. In some embodiments, during assembly, the body and the gland nut may be rotated together to cause external threading of the ferrule to engage an inner wall of the conduit. The connector device is able to provide a liquid tight seal around the conduit, while facilitating quick coupling of conduits without the need for initial disassembly of the coupling device connector before re-assembly and installation.

Figure 2:
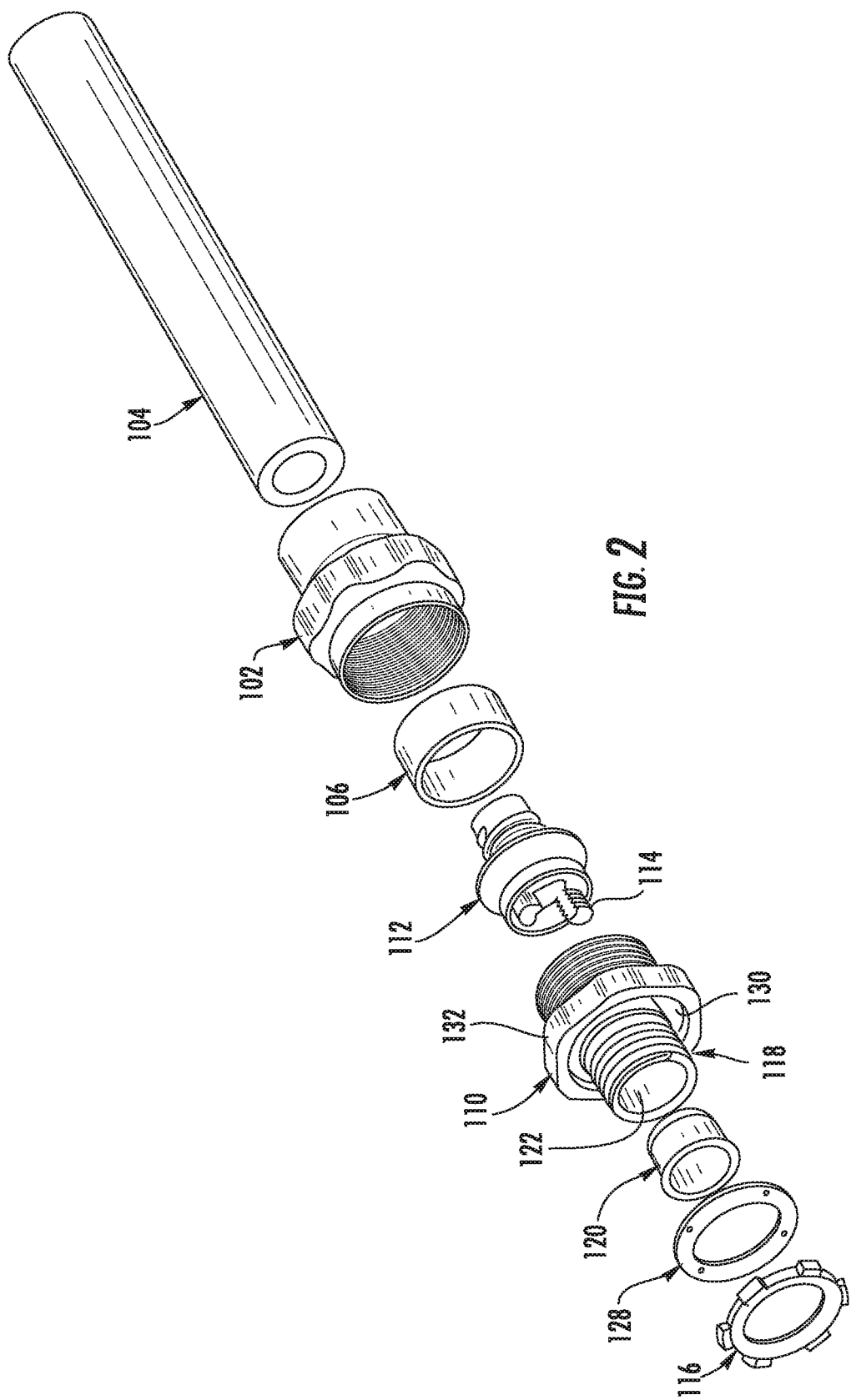
FIG. 2 is an exploded view of the assembly of FIG. 1 in accordance with embodiments of the present disclosure.

Referring now to FIGS. 1-2, an assembly 100 including a connector 101 for coupling a length of non-metallic flexible tubing to a structure, such as a junction box, according to embodiments of the present disclosure will be described in greater detail. As shown, the assembly 100 may include a gland nut 102 for receiving a flexible conduit 104, and a gland ring 106 positionable within the gland nut 102, the gland ring 106 sized to extend snugly around an exterior of the flexible conduit 104.

The assembly 100 may further include a body 110 threadably securable to the gland nut 102. Within the body 110 is a ferrule 112, wherein the ferrule 112 includes a keying feature 114 coupled to a second keying feature (not shown) of the body 110 to cause the ferrule and the body 110 to rotate together. During assembly, the ferrule 112 may be inserted partially into the flexible conduit 104.

The assembly 100 may further include a lock nut 116 secured around an exterior of a first threaded portion 118 of the body 110, and a liner 120 secured within an interior 122 of the first threaded portion 118 of the body 110. An O-ring 128 may be provided around the first threaded portion 118, for example, within a recess 130 adjacent a central hub 132 of the body 110.

In some embodiments, the flexible conduit 104 may be a liquid-tight flexible non-metallic conduit type (LFNC-A) construction per NEC® 356.2(1). For example, the flexible conduit 104 may be a layered raceway of circular cross-section having a smooth flexibly polyvinyl chloride (PVC) inner layer with a reinforcing layer covered with a flexible polyvinyl chloride (PVC) jacket. Although not limited to any particular size or thickness, the wall thicknesses and dimensions of the layered conduit may be selected to comply with Table 1 of harmonized UL® 1660/CSA C22.2 No. 227.2.1 of UL® 1660.

Furthermore, the flexible conduit 104 may be made from a flame retardant compound, and be resistant to sunlight, oil, mild acids, and non-conductive raceway. The flexible conduit 104 may be useful in applications having frequent flexing and/or motion, such as signage and outdoor lighting over 1000 volts per 600.32 (A) (1), hazardous locations per NEC® 501, and industrial and commercial applications. The flexible conduit 104 offers physical protection from abrasion of the conductors inside.

Figure 3:
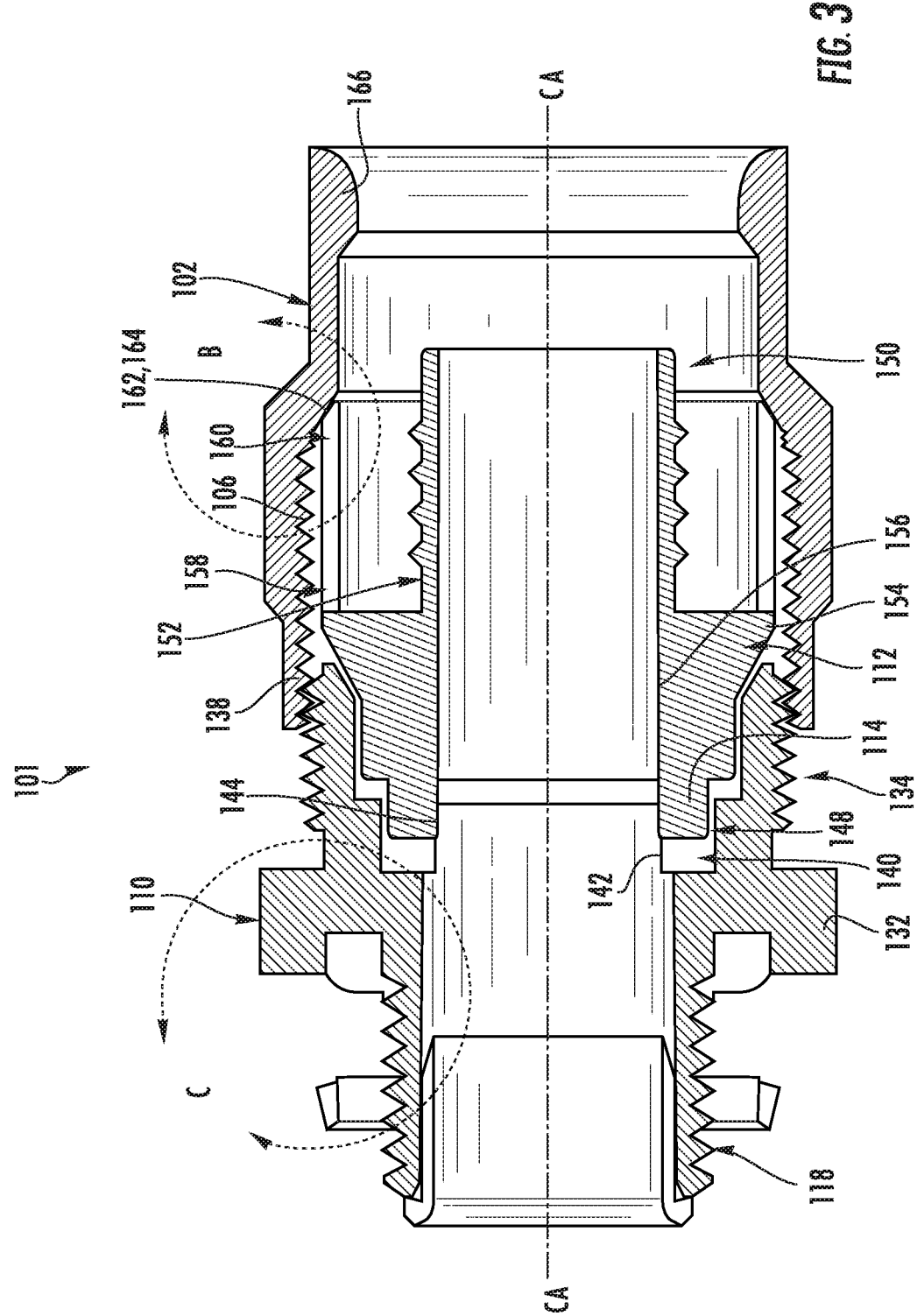
FIG. 3 is a side cross-sectional view of a connector of the assembly of FIG. 1 in accordance with embodiments of the present disclosure.

Turning now to FIG. 3, a side cross-sectional view of the connector 101 according to embodiments of the present disclosure will be described in greater detail. As shown, the body 110 includes the first threaded portion 118 and a second threaded portion 134, wherein the second threaded portion 134 is threadably secured to internal threading 138 of the gland nut 102. The central hub 132 may separate the first threaded portion 118 from the second threaded portion 134, and is provided to enable rotation of the body relative to the gland nut 102. As shown, the body 110 may include a keying feature, such as a slot 140 with one or more flattened surfaces 142 aligned with corresponding flattened surface(s) 144 of the keying feature 114 of the ferrule 112. The keying features of the body 110 and the ferrule 112 operably engage one another to enable simultaneous rotation.

As further shown, the ferrule 112 may include a first end 148 including the keying feature 114, wherein the first end 148 is inserted within the body 110. The ferrule 112 may include a second end 150 opposite the first end 148, the second end 150 including external threading 152, which is surrounded by the flexible conduit (not shown). A flange 154 of the ferrule is disposed between the first and second ends 148, 150, wherein the flange 154 extends in a radial direction to define a conduit stop surface 156 operable for engagement with an end of the conduit. In some embodiments, the conduit stop surface 156 may be substantially perpendicular to a lengthwise central axis 'CA' extending through the connector 101.

The gland ring 106 may be in abutment with the flange 154 of the ferrule 112. More specifically, a first axial end 158 of the gland ring 106 may extend to and engage the conduit stop surface 156 of the flange 154. As shown, the gland nut 102 may include an internal chamfer 166 operable to engage an exterior of the flexible conduit. The internal chamfer 166 may reduce an internal diameter of the gland nut 102 such that the flexible conduit is snugly held in place within the gland nut 102.

Figure 4:
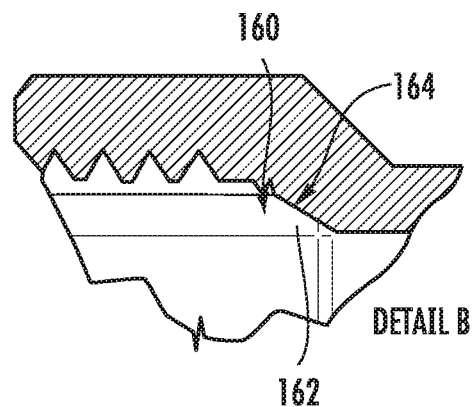
FIG. 4 is a detailed view of a connection between a gland ring and gland nut of the connector of FIG. 3 in accordance with embodiments of the present disclosure.

As shown in FIG. 3 and in FIG. 4, which is a detail view of FIG. 3, a second axial end 160 of the gland ring 106 may include a sloped surface 162 in abutment with an internal shoulder 164 of the gland nut 102. The sloped surface 162 may provide an effective seal between the flexible conduit and the gland nut 102.

Figure 5:
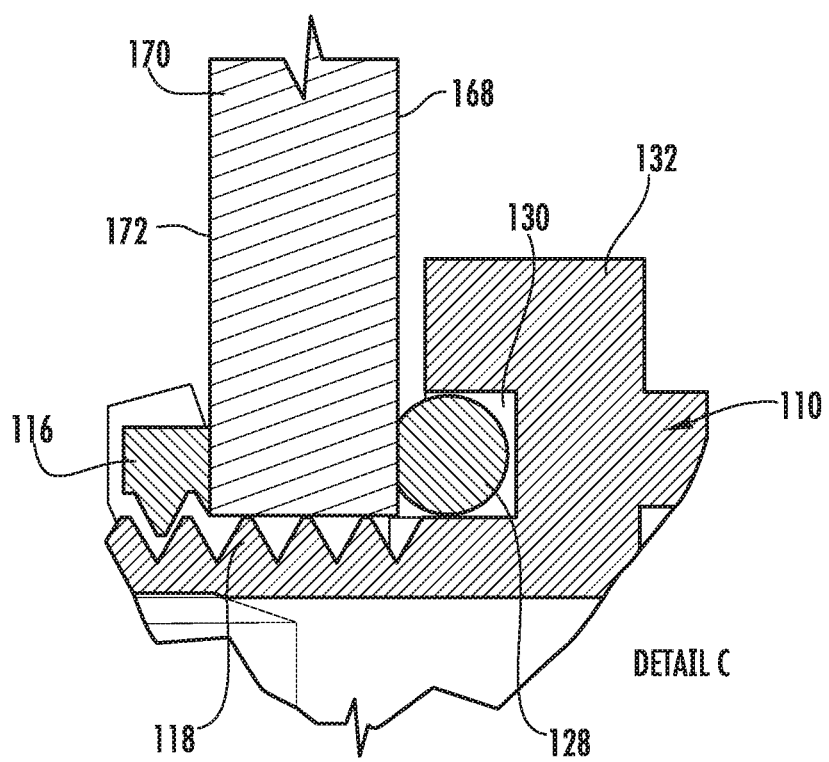
FIG. 5 is a detailed view of a connection between an O-ring and a structure in accordance with embodiments of the present disclosure.

Turning now to FIG. 5, a detail view illustrating the O-ring 128 according to embodiments of the presented disclosure will be described in greater detail. As shown, the O-ring 128 is configured to nest within the recess 130, which may extend into the central hub 132 of the body 110. The O-ring 128 may extend outwardly from the recess 130 for engagement with a first side 168 of a structure 170, which may be a junction box. In some embodiments, the structure 170 may be threaded or unthreaded for engagement with the first threaded portion 118 of the body 110. The lock nut 116 may be rotated into position against a second side 172 of the structure 170 to secure the connector 101 to the structure 170.

Figure 6:
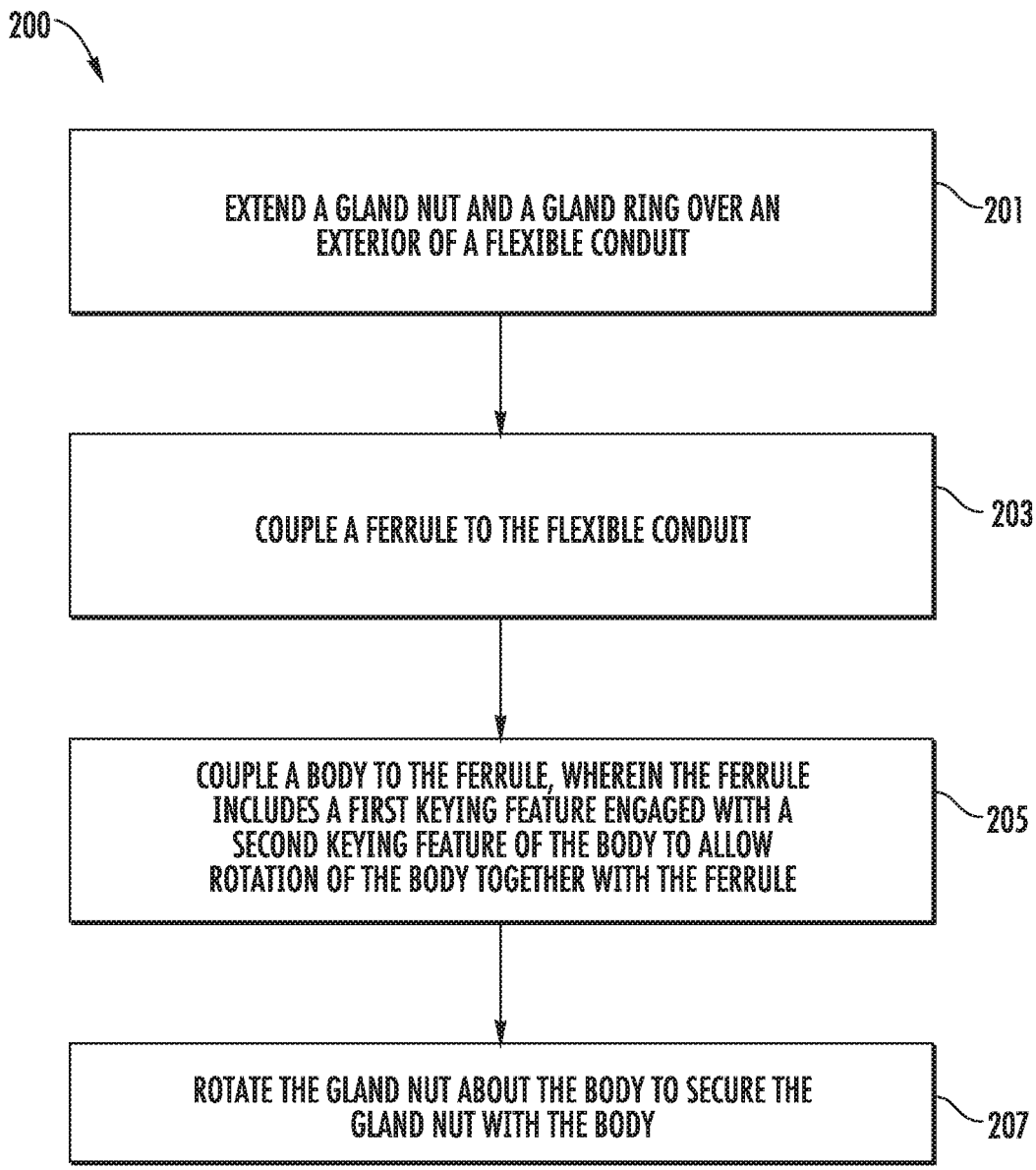
FIG. 6 is a block diagram of a method in accordance with embodiments of the present disclosure.

Turning now to FIG. 6, a method 200 of forming non-metallic liquid-tight (NMLT) assembly according to embodiments of the present disclosure is provided. At block 201, the method may include extending a gland nut and a gland ring over an exterior of a flexible conduit. At block 203, the method 200 may include coupling a ferrule to the flexible conduit. In some embodiments, an external threading of the ferrule extends within the flexible conduit, and a flange of the ferrule is in abutment with an end of the flexible conduit.

At block 205, the method 200 may include coupling a body to the ferrule, wherein the ferrule includes a first keying feature engaged with a second keying feature of the body to allow rotation of the body together with the ferrule. In some embodiments, the body is rotated together with the ferrule to cause the external threading of the ferrule to engage an inner wall of the flexible conduit.

At block 207, the method 200 may include rotating the gland nut about the body to secure the gland nut with the body. In some embodiments, once connected, a first end of the gland ring is in abutment with a conduit stop surface of the ferrule, and a second end of the gland ring is in abutment with an internal shoulder of the gland nut. The second end may include an exterior sloped surface to provide a complementary seal against the internal shoulder of the gland nut. In some embodiments, the gland nut is capable of sliding along/over the flexible conduit towards the body. That is, the gland nut is not directly physically coupled to the flexible conduit. Instead, the gland nut is direct coupled to the body.

Although the illustrative method 200 is described above as a series of acts or events, the present disclosure is not limited by the illustrated ordering of such acts or events unless specifically stated. Some acts may occur in different orders and/or concurrently with other acts or events apart from those illustrated and/or described herein, in accordance with the disclosure. In addition, not all illustrated acts or events may be required to implement a methodology in accordance with the present disclosure. Furthermore, the method 200 may be implemented in association with the formation and/or processing of structures illustrated and described herein as well as in association with other structures not illustrated.

While the present disclosure has been described with reference to certain approaches, numerous modifications, alterations and changes to the described approaches are possible without departing from the spirit and scope of the present disclosure, as defined in the appended claims. Accordingly, it is intended that the present disclosure not be limited to the described approaches, but that it has the full scope defined by the language of the following claims, and equivalents thereof. While the disclosure has been described with reference to certain approaches, numerous modifications, alterations and changes to the described approaches are possible without departing from the spirit and scope of the disclosure, as defined in the appended claims. Accordingly, it is intended that the present disclosure not be limited to the described approaches, but that it has the full scope defined by the language of the following claims, and equivalents thereof.

The invention claimed is:

1. A non-metallic liquid-tight (NMLT) assembly, comprising:
 a gland nut for receiving a non-metallic flexible conduit;
 a gland ring within the gland nut, the gland ring sized to extend around the non-metallic flexible conduit;
 a body threadably secured to the gland nut; and
 a ferrule disposed within the body, wherein the ferrule includes a first keying feature coupled to a second keying feature of the body to enable simultaneous rotation of the ferrule and the body, wherein the ferrule is inserted partially into the non-metallic flexible conduit, and wherein the ferrule includes external threading.

2. The NMLT assembly of claim 1, further comprising an O-ring extending around the body.

3. The NMLT assembly of claim 1, wherein the body includes a first threaded portion and a second threaded portion, wherein the second threaded portion is threadably secured to the gland nut.

4. The NMLT assembly of claim 3, further comprising a lock nut secured around an exterior of the first threaded portion of the body, and a liner secured within an interior of the first threaded portion of the body.

5. The NMLT assembly of claim 1, the ferrule comprising:
 a first end including the first keying feature;
 a second end opposite the first end, the second end including the external threading, wherein the external threading is surrounded by the non-metallic flexible conduit; and
 a flange disposed between the first and second ends, the flange including a conduit stop surface in abutment with an end of the non-metallic flexible conduit.

6. The NMLT assembly of claim 5, wherein the gland ring is in abutment with the conduit stop surface.

7. The NMLT assembly of claim 5, the gland ring comprising:
 a first end in abutment with the conduit stop surface; and
 a second end opposite the first end, the second end including a sloped surface in abutment with an internal shoulder of the gland nut.

8. The NMLT assembly of claim 1, wherein the first keying feature includes a first planar surface aligned with a second planar surface of the second keying feature.

9. A connector, comprising:
 a gland nut for receiving the flexible non-metallic conduit;
 a gland ring within the gland nut, the gland ring sized to extend around the flexible non-metallic conduit;
 a body threadably secured to the gland nut; and
 a ferrule disposed within the body, wherein the ferrule includes a first keying feature coupled to a second keying feature of the body to enable simultaneous rotation of the ferrule and the body, wherein the ferrule is inserted partially into the flexible non-metallic conduit, and wherein the ferrule includes external threading.

10. The connector of claim 9, further comprising an O-ring extending around the body.

11. The connector of claim 9, wherein the body includes a first threaded portion and a second threaded portion, wherein the second threaded portion is threadably secured to the gland nut.

12. The connector of claim 11, further comprising a lock nut secured around an exterior of the first threaded portion of the body, and a liner secured within an interior of the first threaded portion of the body.

13. The connector of claim 9, the ferrule comprising:
 a first end including the first keying feature;
 a second end opposite the first end, the second end including the external threading, wherein the external threading is surrounded by the non-metallic flexible conduit; and
 a flange disposed between the first and second ends, the flange including a conduit stop surface in abutment with an end of the flexible non-metallic conduit.

14. The connector of claim 13, wherein the gland ring is in abutment with the conduit stop surface.

15. The connector of claim 13, the gland ring comprising:
a first end in abutment with the conduit stop surface; and
a second end opposite the first end, the second end including a sloped surface in abutment with an internal shoulder of the gland nut.

16. The connector of claim 9, wherein the first keying feature includes a first planar surface aligned with a second planar surface of the second keying feature.

17. A method of forming non-metallic liquid-tight (NMLT) assembly, the method comprising:
extending a gland nut and a gland ring over an exterior of a flexible conduit;
coupling a ferrule with the flexible conduit, wherein an external threading of the ferrule extends within the flexible conduit, and wherein a flange of the ferrule is in abutment with an end of the flexible conduit;
coupling a body to the ferrule, wherein the ferrule includes a first keying feature engaged with a second keying feature of the body to allow rotation of the body together with the ferrule; and
rotating the gland nut about the body to secure the gland nut with the body.

18. The method of claim 17, further comprising:
engaging a first end of the gland ring in abutment with a conduit stop surface of the ferrule; and
engaging a second end of the gland ring with an internal shoulder of the gland nut, wherein the second end includes a sloped surface.

19. The method of claim 17, further comprising rotating the body together with the ferrule to cause the external threading of the ferrule to engage an inner wall of the flexible conduit.

20. The method of claim 17, further comprising sliding the gland nut over the flexible conduit towards the body, wherein the gland nut is not directly physically coupled to the flexible conduit.

* * * * *